US010786085B2

(12) United States Patent
Tsai

(10) Patent No.: US 10,786,085 B2
(45) Date of Patent: Sep. 29, 2020

(54) MODULAR BED ASSEMBLY

(71) Applicant: ULIFE HEALTHCARE INC., Taoyuan (TW)

(72) Inventor: Chi-Lung Tsai, Taichung (TW)

(73) Assignee: ULIFE HEALTHCARE INC., Taoyuan (TW)

( * ) Notice: Subject to any disclaimer, the term of this patent is extended or adjusted under 35 U.S.C. 154(b) by 260 days.

(21) Appl. No.: 16/128,680

(22) Filed: Sep. 12, 2018

(65) Prior Publication Data

US 2019/0350374 A1 Nov. 21, 2019

(30) Foreign Application Priority Data

May 15, 2018 (TW) .............................. 107206318 U

(51) Int. Cl.
*A47C 19/00* (2006.01)
*F16B 12/54* (2006.01)
*A47C 19/12* (2006.01)

(52) U.S. Cl.
CPC ............ *A47C 19/005* (2013.01); *A47C 19/12* (2013.01); *F16B 12/54* (2013.01)

(58) Field of Classification Search
None
See application file for complete search history.

(56) References Cited

U.S. PATENT DOCUMENTS

| 1,724,852 | A | * | 8/1929 | Scott | .................... | A47C 19/128 |
| | | | | | | 5/174 |
| 2009/0025143 | A1 | * | 1/2009 | Oh | ........................ | A47C 19/005 |
| | | | | | | 5/201 |
| 2018/0094665 | A1 | * | 4/2018 | Harrow | ................... | F16B 12/60 |

* cited by examiner

*Primary Examiner* — David R Hare
*Assistant Examiner* — Adam C Ortiz
(74) *Attorney, Agent, or Firm* — Allen, Dyer, Doppelt + Gilchrist, PA

(57) ABSTRACT

A modular bed assembly includes four foldable frames each including a first elongated plate, a second elongated plate which is hinged connected to the first elongated plate, and a corner bracing member. In an unfolded position, first and second elongated bodies of the first and second elongated plates form an included angle therebetween. In a folded position, the first and second elongated plates are stacked on each other to define therebetween an accommodation space. The corner bracing member may be connected between the first and second elongated plates to keep the included angle when in the unfolded position, and may be received in the accommodation space when in the folded position.

10 Claims, 13 Drawing Sheets

MODULAR BED ASSEMBLY

CROSS-REFERENCE TO RELATED APPLICATION

This application claims priority from Taiwanese utility model patent application no. 107206318, filed on May 15, 2018.

FIELD

The disclosure relates to a modular bed assembly, more particularly to a modular bed assembly including four foldable frames.

BACKGROUND

For easy transportation, a conventional bed frame may be disassembled into a plurality of component parts. The component parts may not be compactly stacked together, which may cause a transportation box for the bed frame to be undesirably bulky.

SUMMARY

Therefore, an object of the disclosure is to provide a novel modular bed assembly which can be disassembled into a plurality of component parts that can be compactly stacked together.

According to the disclosure, a modular bed assembly includes four foldable frames each including a first elongated plate, a second elongated plate, and a corner bracing member. The first elongated plate has a first connected end, a first hinged end, and a first elongated body which is disposed between the first connected and hinged ends, and which has a first inner surface formed with a first grooved region that has a first proximate end and a first distal end relative to the first hinged end. The second elongated plate has a second connected end, a second hinged end, and a second elongated body which is disposed between the second connected and hinged ends, and which has a second inner surface formed with a second grooved region. The second hinged end is hingedly connected to the first hinged end about a hinge axis to permit the second connected end to be angularly movable relative to the first connected end between an unfolded position, where the first and second elongated bodies form an included angle therebetween, and a folded position, where the first and second elongated bodies are stacked on each other to permit the first and second grooved regions to define therebetween an accommodation space. The corner bracing member extends lengthwise to terminate at a coupling end, and a mounted end which is pivotably mounted to the first proximate end about a pivot axis parallel to the hinge axis, such that when in the unfolded position, the coupling end is permitted to be detachably coupled to the second inner surface to keep the included angle, and such that once the coupling end is detached from the second inner surface, the corner bracing member is permitted to be fit in the accommodation space. Two of the foldable frames are coupled to each other to form a front sub-assembly, while the other two of the foldable frames are coupled to each other to form a rear sub-assembly. The second connected ends of the front sub-assembly are detachably connected to each other, and the second connected ends of the rear sub-assembly are detachably connected to each other. The first connected ends of the front sub-assembly are detachably connected to the first connected ends of the rear sub-assembly, respectively.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
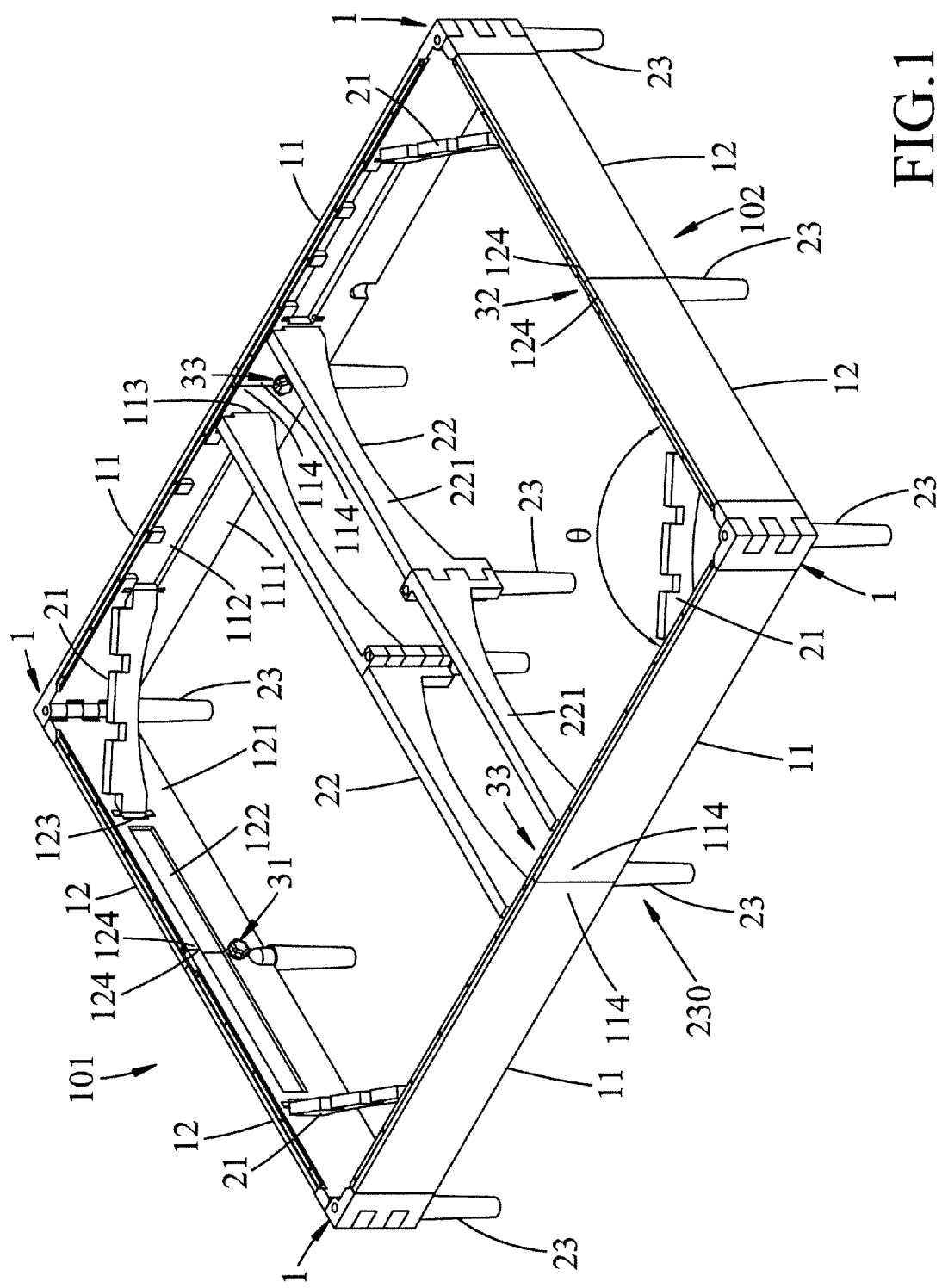
FIG. 1 is a perspective view of a modular bed assembly according to an embodiment of the disclosure.

Before the disclosure is described in greater detail, it should be noted that where considered appropriate, reference numerals have been repeated among the figures to indicate corresponding or analogous elements, which may optionally have similar characteristics.

Referring to FIG. 1, a modular bed assembly according to an embodiment of the disclosure is shown to include four foldable frames 1, each of which includes a first elongated plate 11, a second elongated plate 12, and a corner bracing member 21. The modular bed assembly may be used for supporting a mattress (not shown).

Figure 4:
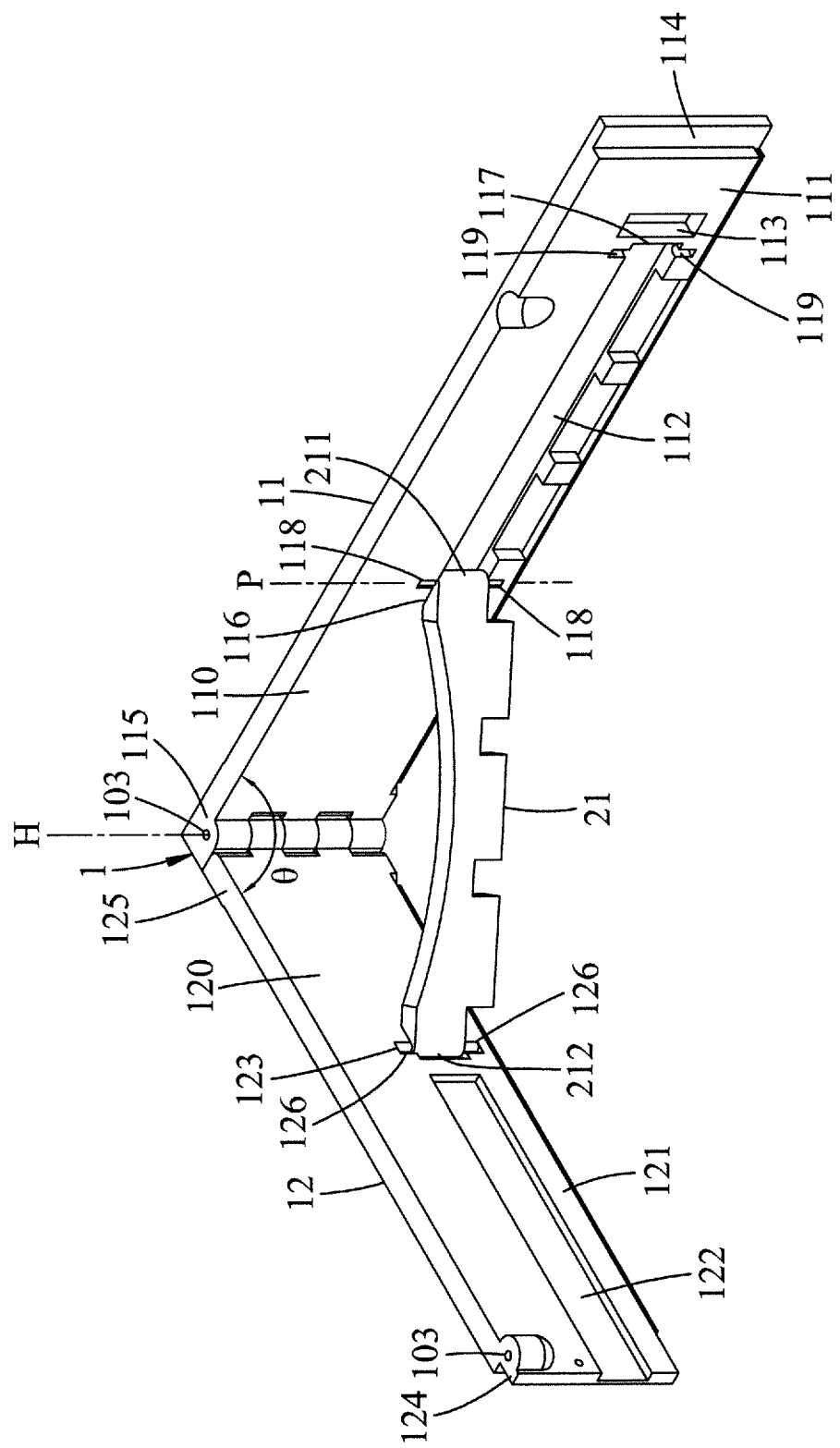
FIG. 4 is a perspective bottom view of a foldable frame of the modular bed assembly.
Figure 5:
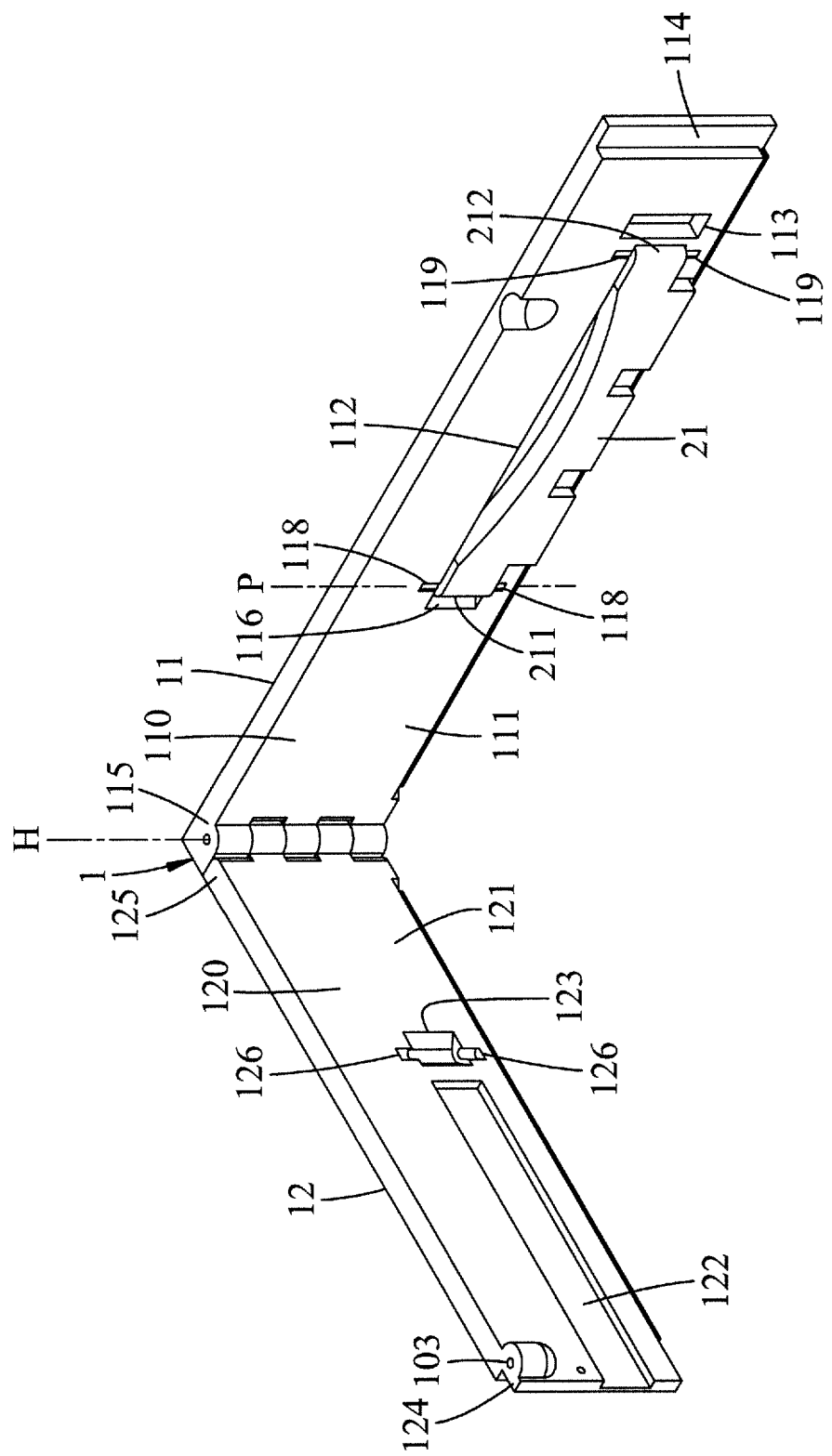
FIG. 5 is similar to FIG. 4 but illustrating that a corner bracing member of the foldable frame is fit in a first grooved region.

As shown in FIGS. 4 and 5, the first elongated plate 11 has a first connected end 114, a first hinged end 115, and a first elongated body 111. The first elongated body 111 is disposed between the first connected and hinged ends 114, 115, and has a first inner surface 110 formed with a first grooved region 112 which has a first proximate end 116 and a first distal end 117 relative to the first hinged end 115.

Figure 6:
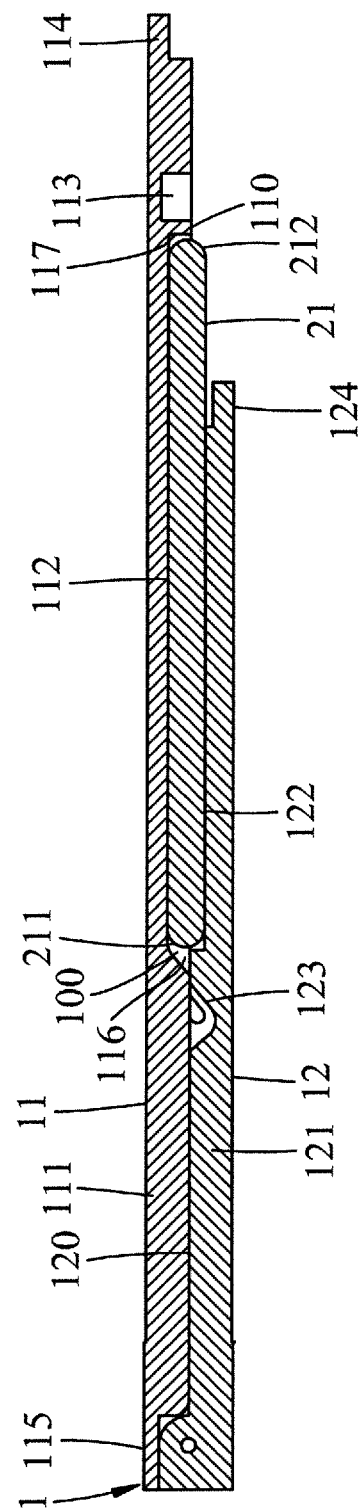
FIG. 6 is a cross-sectional view of the foldable frame in a folded position.

The second elongated plate 12 has a second connected end 124, a second hinged end 125, and a second elongated body 121. The second elongated body 121 is disposed between the second connected and hinged ends 124, 125, and has a second inner surface 120 formed with a second grooved region 122. The second hinged end 125 is hingedly connected to the first hinged end 115 about a hinge axis (H) to permit the second connected end 124 to be angularly movable relative to the first connected end 114 between an unfolded position and a folded position. In the unfolded position, as shown in FIGS. 1 and 4, the first and second elongated bodies 111, 121 form an included angle (θ) therebetween. In the folded position, as shown in FIG. 6, the first and second elongated bodies 111, 121 are stacked on each other to permit the first and second grooved regions 112, 122 to define therebetween an accommodation space 100. The included angle (θ) may range from 85° to 95°. In an embodiment shown in FIGS. 1 and 4, the included angle (θ) is 90°.

Figure 2:
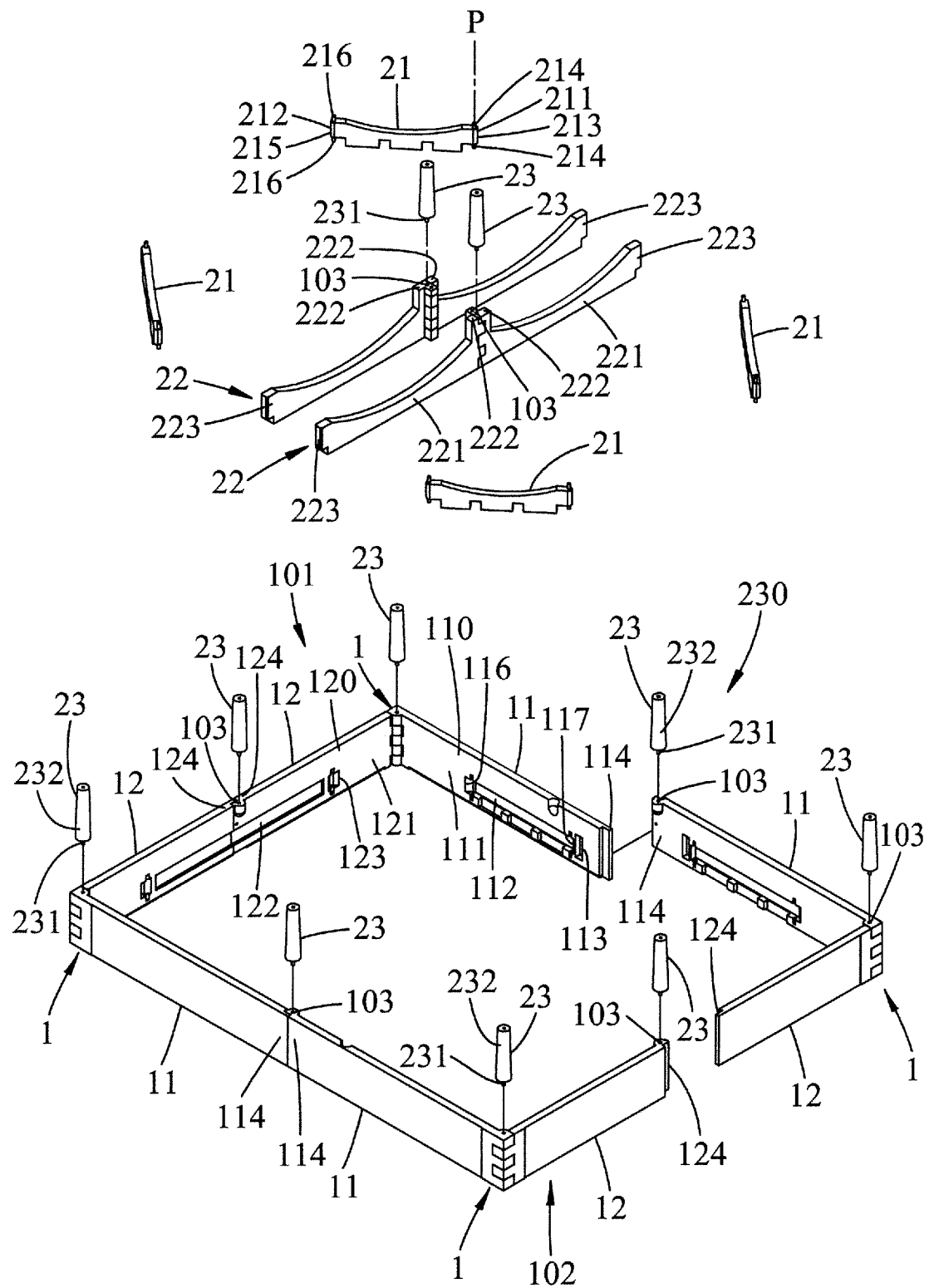
FIG. 2 is a partial exploded perspective bottom view of the modular bed assembly.

As shown in FIGS. 2, 4, and 5, the corner bracing member 21 extends lengthwise to terminate at a coupling end 212 and a mounted end 211. The mounted end 211 is pivotably mounted to the first proximate end 116 about a pivot axis (P) parallel to the hinge axis (H). When in the unfolded position, as shown in FIGS. 1 and 4, the coupling end 212 is permitted to be detachably coupled to the second inner surface 120 to keep the included angle (θ). Once the coupling end 212 is detached from the second inner surface 120, the corner bracing member 21 is permitted to be fit in the accommodation space 100 as shown in FIG. 6.

As shown in FIGS. 1 and 2, two of the foldable frames 1 are coupled to each other to form a front sub-assembly 101, while the other two of the foldable frames 1 are coupled to each other to form a rear sub-assembly 102. The second connected ends 124 of the front sub-assembly 101 are detachably connected to each other, and the second connected ends 124 of the rear sub-assembly 102 are detachably connected to each other. The first connected ends 114 of the front sub-assembly 101 are detachably connected to the first connected ends 114 of the rear sub-assembly 102, respectively.

Figure 3:
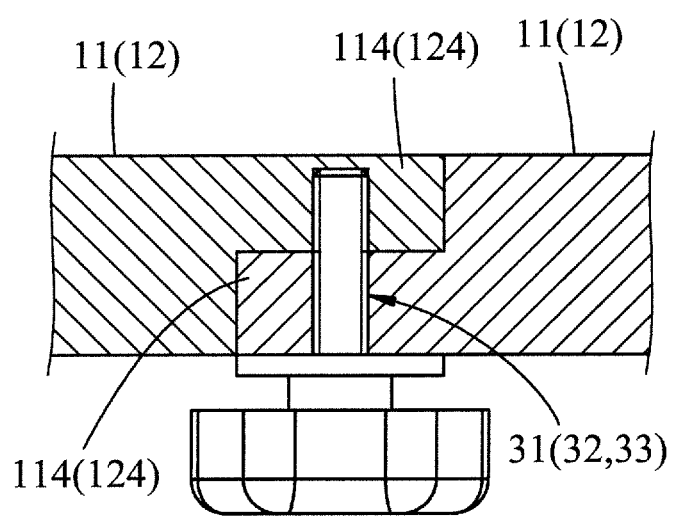
FIG. 3 is a fragmentary enlarged partial cross-sectional view illustrating the connection between a pair of first elongated plates or between a pair of second elongated plates in the modular bed assembly.

In an embodiment shown in FIGS. 2 to 5, the second connected ends 124 of the front sub-assembly 101 are configured to mate with each other to permit the second elongated plates 12 of the front sub-assembly 101 to be brought into detachably interference engagement with each other. In FIGS. 1 and 3, a threaded fastener 31 may be used for fastening the second connected ends 124 of the front sub-assembly 101.

In addition, the second connected ends 124 of the rear sub-assembly 102 are configured to mate with each other to permit the second elongated plates 12 of the rear sub-assembly 102 to be brought into detachably interference engagement with each other. In FIGS. 1 and 3, a threaded fastener 32 may be used for fastening the second connected ends 124 of the rear sub-assembly 102.

Furthermore, the first connected ends 114 of the front sub-assembly 101 are configured to respectively mate with the first connected ends 114 of the rear sub-assembly 102 so as to permit the first elongated plates 11 of the front sub-assembly 101 to be brought into detachably interference engagement with the first elongated plates 11 of the rear sub-assembly 102, respectively. In FIGS. 1 and 3, two threaded fasteners 33 may be used for fastening the first connected ends 114 of the front sub-assembly 101 respectively to the first connected ends 114 of the rear sub-assembly 102.

In an embodiment shown in FIGS. 2, 4, and 5, the mounted end 211 of the corner bracing member 21 is in the form of a first pin shaft 213 extending along the pivot axis (P) to terminate at two first pin ends 214. The coupling end 212 of the corner bracing member 21 is in the form of a second pin shaft 215 extending in a direction parallel to the pivot axis (P) to terminate at two second pin ends 216.

Furthermore, the first inner surface 110 has a pair of first pin slits 118 which extend oppositely from first grooved region 112 in proximity to the first proximate end 116, and which are configured to permit the first pin ends 214 to be respectively fit therein so as to render the mounted end 211 of the corner bracing member 21 to be pivotably mounted to the first proximate end 116.

Moreover, the second inner surface 120 has a retaining groove 123 which is formed between the second hinged end 125 and the second grooved region 122, and which extends in a direction parallel to the hinge axis (H) to terminate at a pair of second pin slits 126 that are configured to permit the second pin ends 216 to be respectively fit therein so as to allow the coupling end 212 to be detachably coupled to the second inner surface 120.

In an embodiment shown in FIGS. 2, 4, and 5, the first inner surface 110 may further have a pair of third pin slits 119 which extend oppositely from first grooved region 112 in proximity to the first distal end 117, and which are configured to permit the second pin ends 216 to be respectively fit therein so as to allow the coupling end 212 of the corner bracing member 21 to be detachably coupled to the first distal end 117, to thereby facilitate the corner bracing member 21 to be fit in the accommodation space 100.

Figure 7:
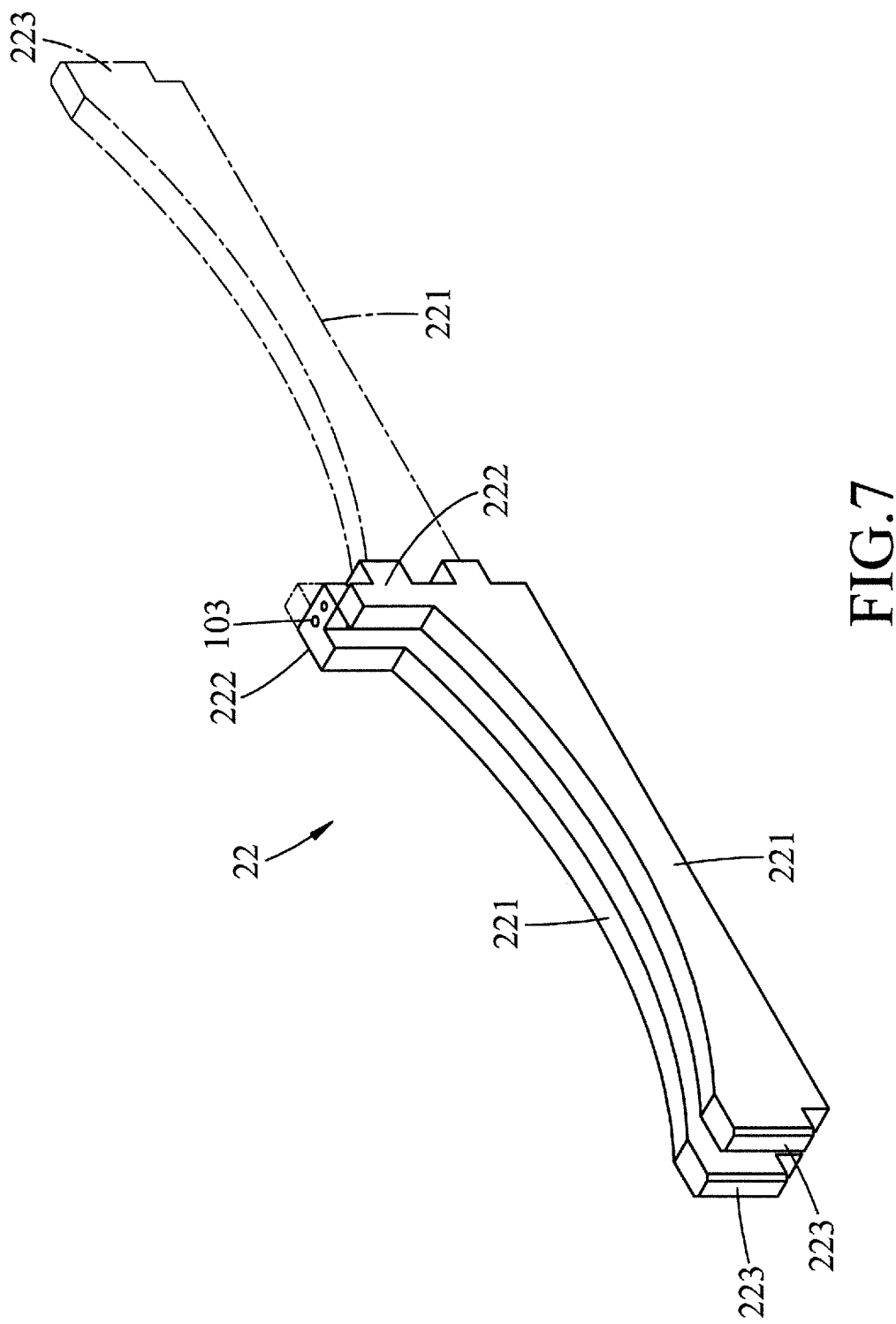
FIG. 7 is a perspective view of a collapsible bracing unit for the modular bed assembly.

In an embodiment shown in FIGS. 1, 2, and 7, the modular bed assembly may further include a pair of collapsible bracing units 22. Each of the collapsible bracing units 22 includes a pair of elongated pieces 221 each of which has a third hinged end 222 and a third connected end 223. The third hinged ends 222 of each of the collapsible bracing units 22 are hingedly connected to each other to permit the third connected ends 223 of the corresponding collapsible bracing unit 22 to be angularly movable relative to each other between a collapsed position and an extended position. In the collapsed position, the elongated pieces 221 of the corresponding collapsible bracing unit 22, which are both shown by solid lines in FIG. 7, are stacked on each other. In the extended position, the elongated pieces 221 of the corresponding collapsible bracing unit 22, one of which is shown by phantom lines, are in line with each other. The third connected ends 223 of each of the collapsible bracing units 22 are configured to be detachably and respectively connected to the first inner surfaces 110 of the first elongated plates 11 of a respective one of the front and rear sub-assemblies 101, 102 so as to strengthen the respective one of the front and rear sub-assemblies 101, 102.

In an embodiment shown in FIGS. 2, 4, and 5, the first inner surface 110 has a concave region 113 which is disposed between the first grooved region 112 and the first connected end 114, and which is configured to permit a respective one of the third connected ends 223 of the elongated pieces 221 of the collapsible bracing units 22 to be pressed fit thereinto.

In an embodiment shown in FIGS. 1 and 2, the modular bed assembly may further include a leg unit 230 which is configured to elevate and place the front and rear sub-assemblies 101, 102 in a stationary state, and which includes a plurality of legs 23.

In an embodiment shown in FIG. 2, a plurality of engaging holes 103 may be formed in bottom sides of the first and second elongated plates 11, 12 and bottom sides of the collapsible bracing units 22. Each of the legs 23 may include a leg body 232 and an engaging pin 231 which is configured to be in frictional engagement in a respective one of the engaging holes 103 to thereby permit the leg unit 230 to elevate and place the front and rear sub-assemblies 101, 102 in the stationary state. The frictional engagement between the engaging pin 231 and the respective engaging hole 103 may be by threaded means, interference fit, and so on. The number of the legs 23 may be varied based on design requirement.

Figure 8:
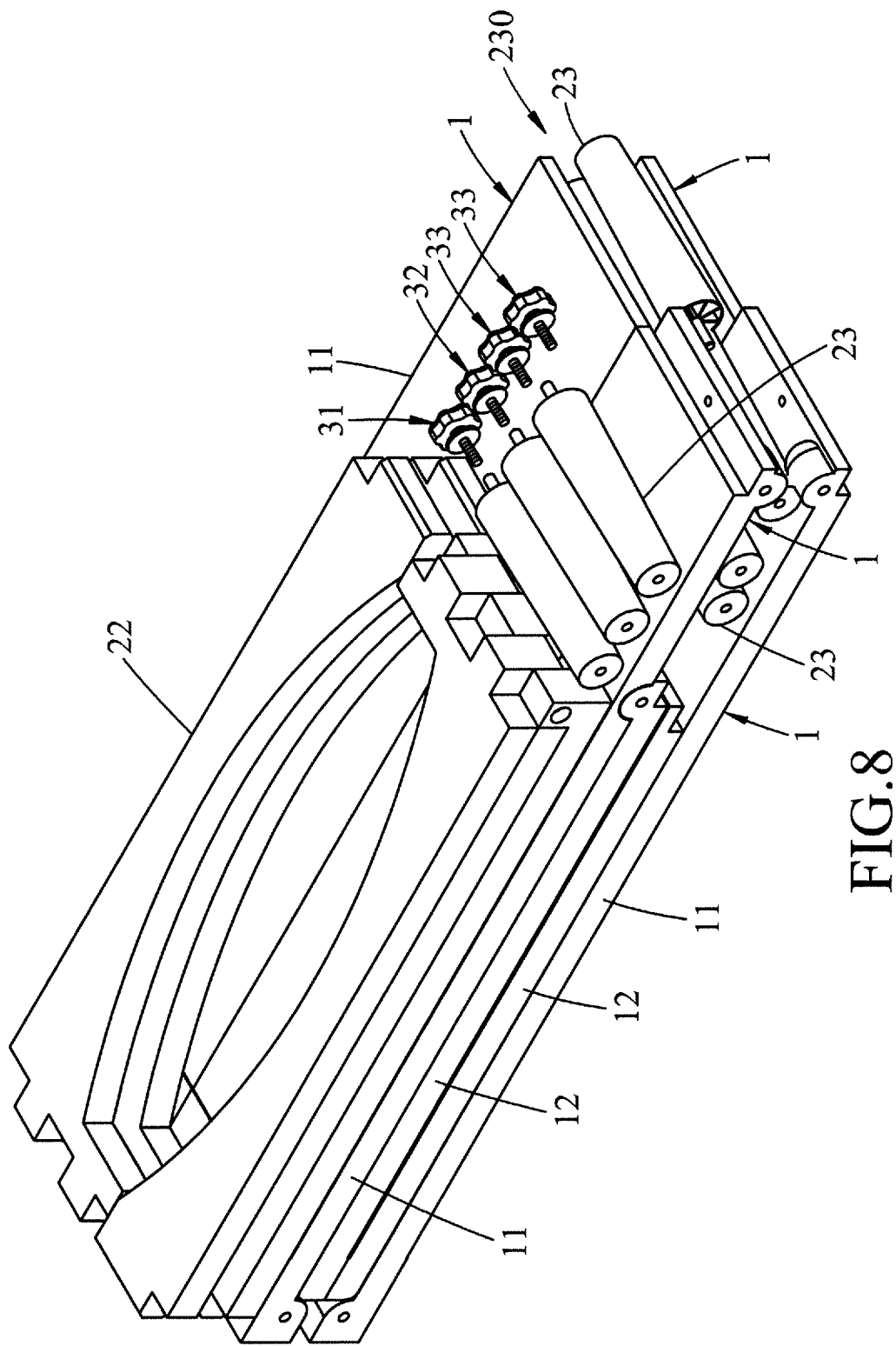
FIG. 8 is a perspective view illustrating component parts of the modular bed assembly to be compactly stacked together.

As shown in FIG. 8, after disassembling, the component parts of the modular bed assembly may be compactly stacked on each other.

Figure 9:
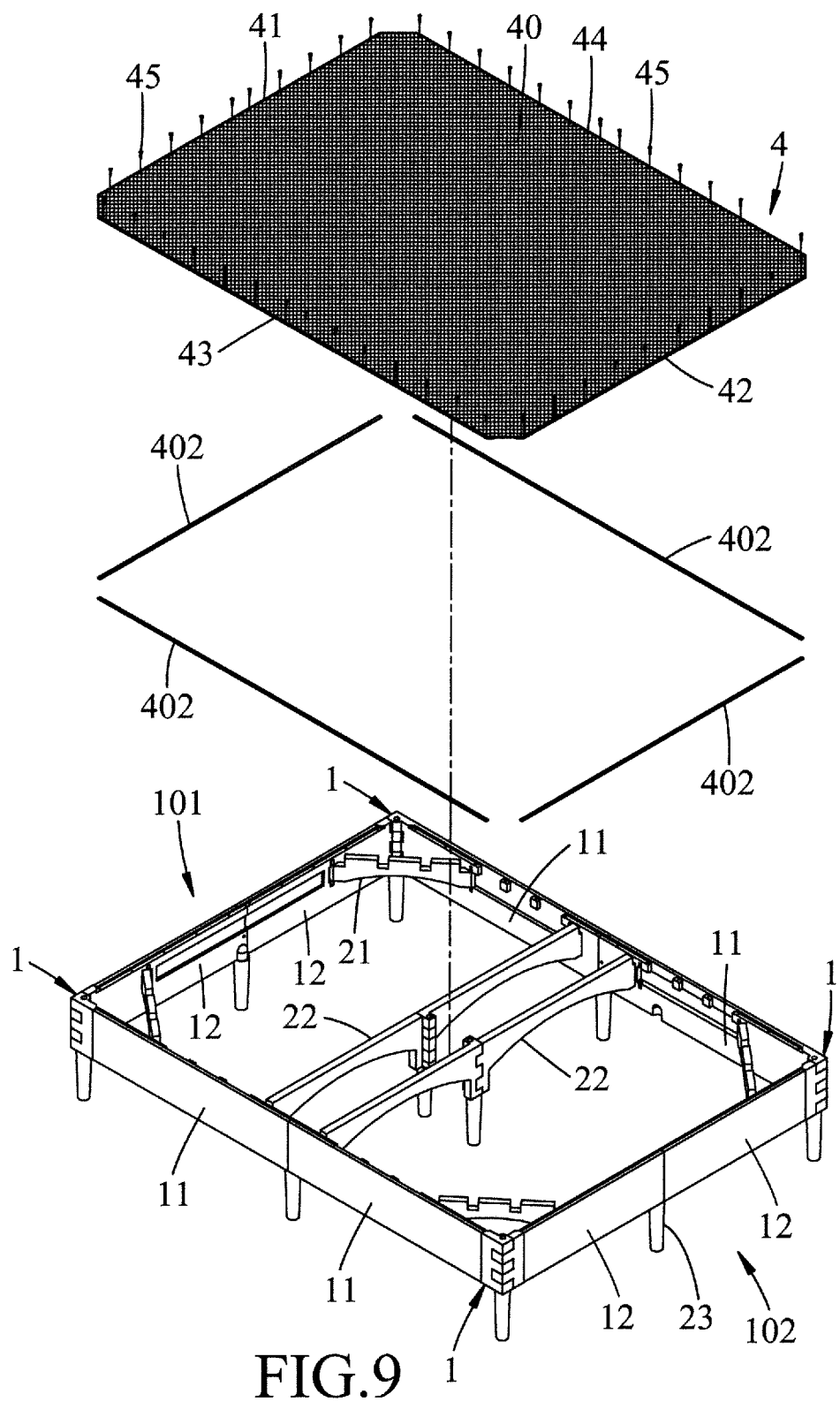
FIG. 9 is a partial exploded perspective view illustrating that the modular bed assembly may further include a supporting web and four reinforcing pieces.
Figure 10:
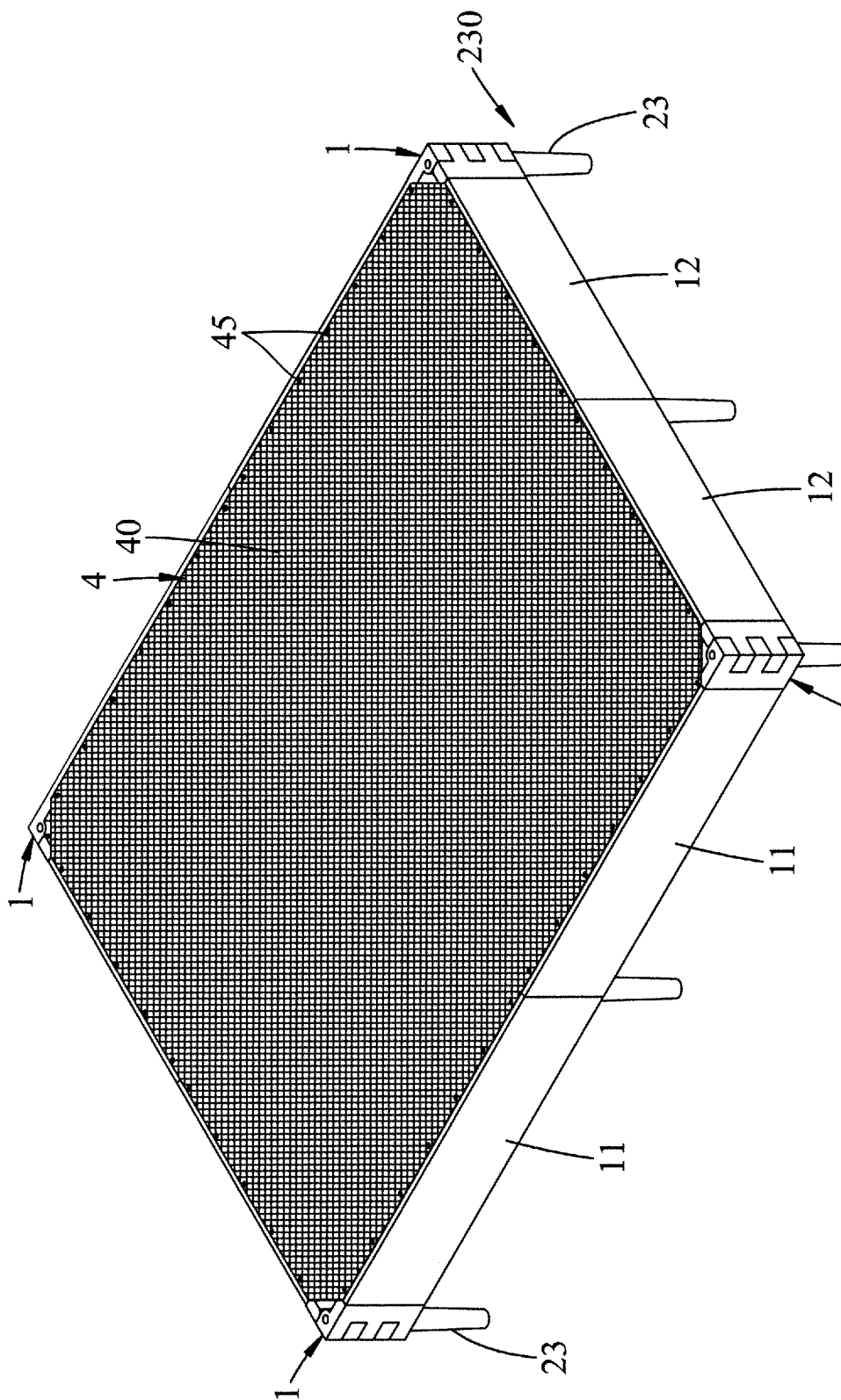
FIG. 10 is a perspective view of the modular bed assembly of FIG. 9 in an assembled state.

In an embodiment shown in FIGS. 9 and 10, the modular bed assembly may further include a supporting web 4 which is configured to be stretched between the front and rear sub-assemblies 101, 102 in a stretching position to elastically support the mattress (not shown). The supporting web 4 includes a web body 40, a front lateral portion 41, a rear lateral portion 42, a left lateral portion 43, and a right lateral portion 44.

The front lateral portion 41 is disposed at a front side of the web body 40, and is configured to be secured to the second elongated plates 12 of the front sub-assembly 101.

The rear lateral portion 42 is disposed at a rear side of the web body 40, and is configured to be secured to the second elongated plates 12 of the rear sub-assembly 102.

The left lateral portion 43 is disposed at a left side of the web body 40, and is configured to be secured to two left ones of the first elongated pieces 11 of the front and rear sub-assemblies 101, 102.

The right lateral portion 44 is disposed at a right side of the web body 40, and is configured to be secured to two right ones of the first elongated pieces 11 of the front and rear sub-assemblies 101, 102.

Figure 12:
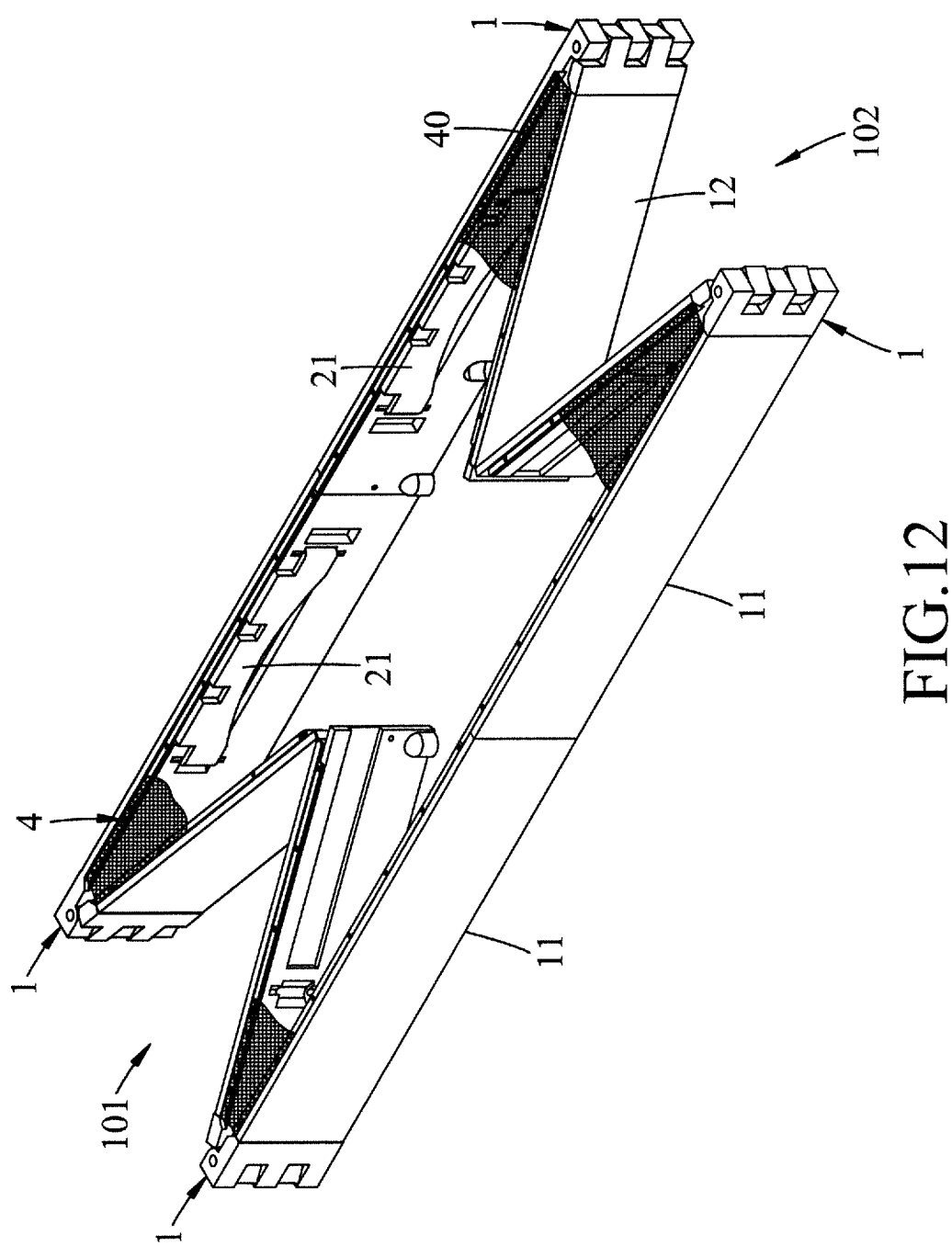
FIG. 12 is a perspective view illustrating that when the modular bed assembly is to be disassembled, the supporting web may be retained on the foldable frames.

When each of the foldable frames 1 is in the unfolded position, the supporting web 4 is stretched in the stretching position (see FIG. 10). When each of the foldable frames 1 is displaced toward the folded position (see FIG. 12), the supporting web 4 may be deformed or folded to reduce its volume.

Figure 11:
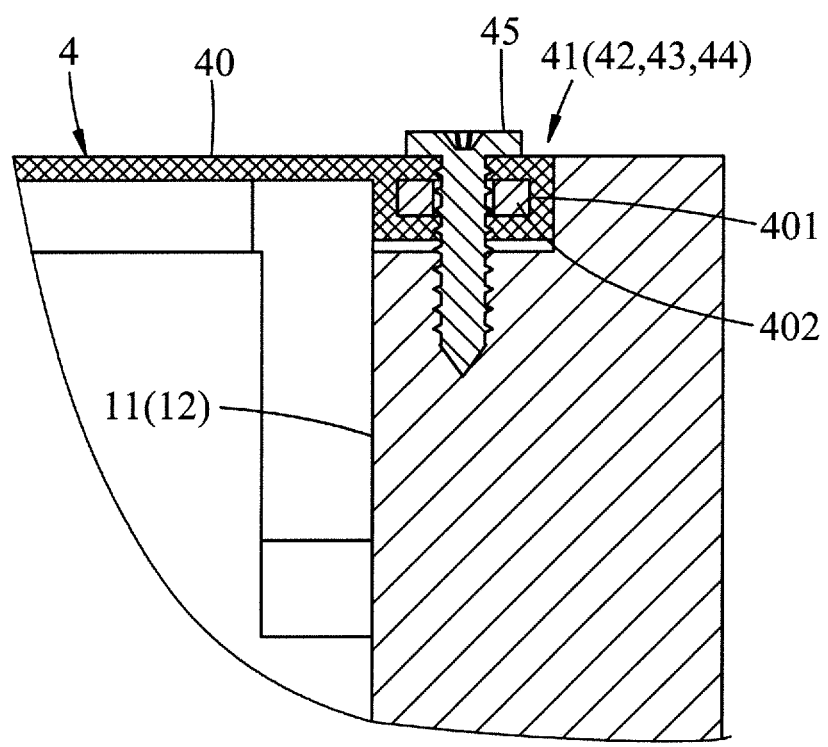
FIG. 11 is a fragmentary enlarged partial cross-sectional view of the modular bed assembly of FIG. 10.

In an embodiment shown in FIGS. 9 and 11, each of the front, rear, left, right lateral portions 41, 42, 43, 44 is enlarged compared to the web body 40, and is in the form of a tubular sleeve 401. The modular bed assembly may further include four reinforcing pieces 402 each of which is configured to be inserted in the tubular sleeve 401 of a respective one of the front, rear, left, right lateral portions 41, 42, 43, 44 so as to facilitate each of the front, rear, left, right lateral portions 41, 42, 43, 44 to be secured to two corresponding ones of the first and second elongated pieces 11, 12 of the front and rear sub-assemblies 101, 102.

Each of the front, rear, left, right lateral portions 41, 42, 43, 44 may be secured to the two corresponding ones of the first and second elongated pieces 11, 12 by at least one fastening member 45. The fastening member 45 is configured to extend through the corresponding one of the front, rear, left, right lateral portions 41, 42, 43, 44 and the respective reinforcing piece 402 to be secured to the respective one of the first and second elongated pieces 11, 12.

Optionally, each of the reinforcing pieces 402 may have a plurality of discrete segments (not shown) which are displaced from each other in the respective tubular sleeve 401 so as to facilitate the folding of each of the foldable frames 1 in a process for disassembling the modular bed assembly.

Figure 13:
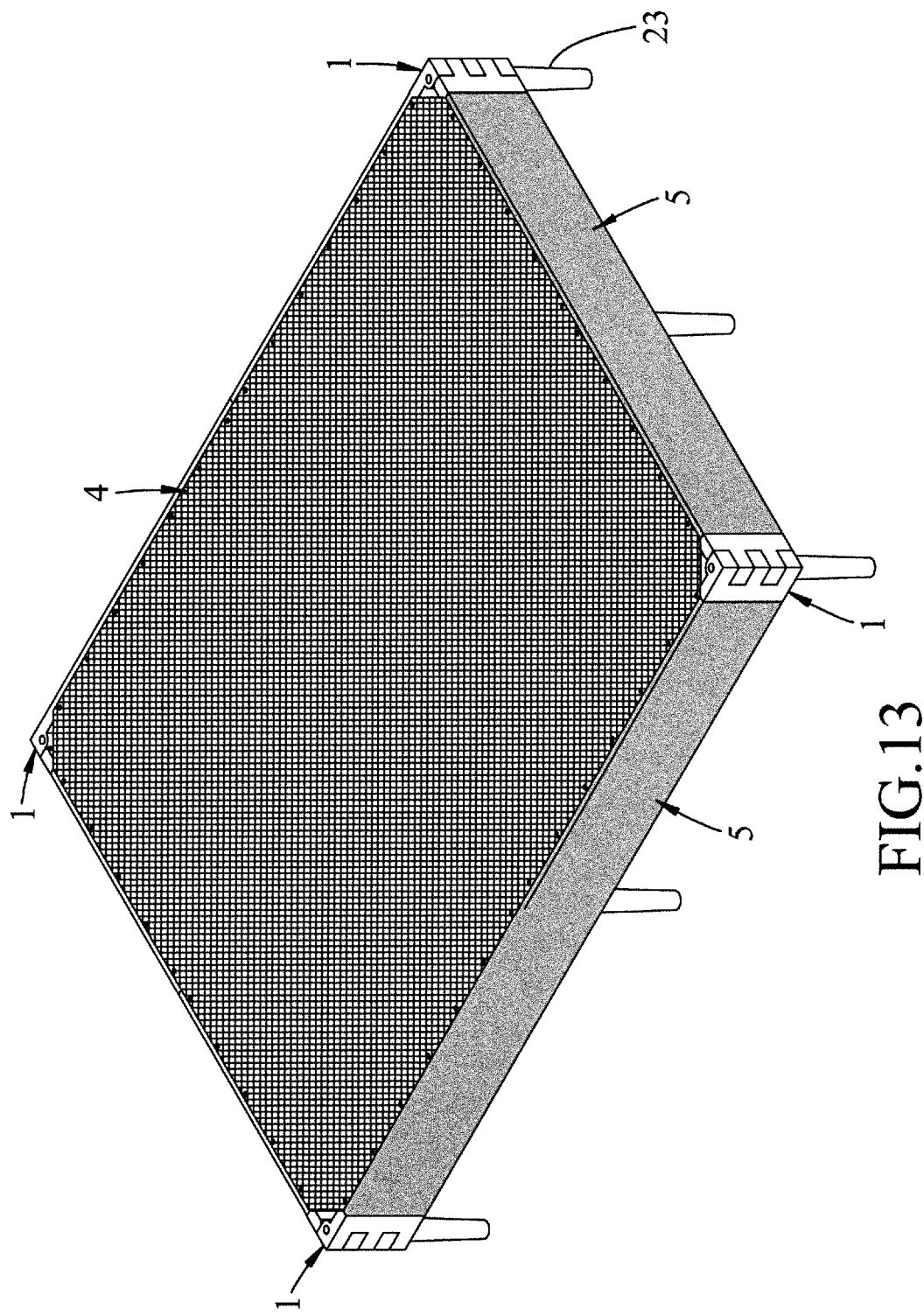
FIG. 13 is similar to FIG. 10 but illustrating a plurality of faceplates attached to outer side surfaces of the modular bed assembly.

Each of the first and second elongated plates 11, 12 may be made from a plastic material, a wood material, a metal material, and so on. When the first and second elongated plates 11, 12 are made from a plastic material, a relatively lightweight modular bed assembly may be achieved. In an embodiment shown in FIG. 13, four faceplates 5 may be attached on four side surfaces of the modular bed assembly for decoration.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A modular bed assembly comprising four foldable frames each including:
   a first elongated plate having a first connected end, a first hinged end, and a first elongated body which is disposed between said first connected and hinged ends, and which has a first inner surface formed with a first grooved region that has a first proximate end and a first distal end relative to said first hinged end;
   a second elongated plate having a second connected end, a second hinged end, and a second elongated body which is disposed between said second connected and hinged ends, and which has a second inner surface formed with a second grooved region, said second hinged end being hingedly connected to said first hinged end about a hinge axis to permit said second connected end to be angularly movable relative to said first connected end between an unfolded position, where said first and second elongated bodies form an included angle therebetween, and a folded position, where said first and second elongated bodies are stacked on each other to permit said first and second grooved regions to define therebetween an accommodation space; and
   a corner bracing member extending lengthwise to terminate at a coupling end, and a mounted end which is pivotably mounted to said first proximate end about a pivot axis parallel to said hinge axis, such that when in said unfolded position, said coupling end is permitted to be detachably coupled to said second inner surface to keep said included angle, and such that once said coupling end is detached from said second inner surface, said corner bracing member is permitted to be fit in said accommodation space, wherein two of said foldable frames are coupled to each other to form a front sub-assembly, while the other two of said foldable frames are coupled to each other to form a rear sub-assembly, said second connected ends of said front sub-assembly are detachably connected to each other, and said second connected ends of said rear sub-assembly are detachably connected to each other, and said first connected ends of said front sub-assembly are detachably connected to said first connected ends of said rear sub-assembly, respectively.

2. The modular bed assembly as claimed in claim 1, wherein said mounted end of said corner bracing member is in a form of a first pin shaft extending along said pivot axis to terminate at two first pin ends, said coupling end of said corner bracing member is in the form of a second pin shaft extending in a direction parallel to said pivot axis to terminate at two second pin ends, said first inner surface has a pair of first pin slits which extend oppositely from first grooved region in proximity to said first proximate end, and which are configured to permit said first pin ends to be respectively fit therein so as to render said mounted end of said corner bracing member to be pivotably mounted to said first proximate end, and said second inner surface has a retaining groove which is formed between said second hinged end and said second grooved region, and which extends in a direction parallel to said hinge axis to terminate at a pair of second pin slits that are configured to permit said second pin ends to be respectively fit therein so as to allow said coupling end to be detachably coupled to said second inner surface.

3. The modular bed assembly as claimed in claim 1, wherein said first inner surface further has a pair of third pin slits which extend oppositely from first grooved region in proximity to said first distal end, and which are configured to permit said second pin ends to be respectively fit therein so as to allow said coupling end of said corner bracing member to be detachably coupled to said first distal end, to thereby facilitate said corner bracing member to be fit in said accommodation space.

4. The modular bed assembly as claimed in claim 1, wherein said included angle ranges from 85° to 95°.

5. The modular bed assembly as claimed in claim 1, further comprising a pair of collapsible bracing units each including a pair of elongated pieces, each of said elongated pieces having a third hinged end and a third connected end, said third hinged ends of each of said collapsible bracing units being hingedly connected to each other to permit said third connected ends of said corresponding collapsible bracing unit to be angularly movable relative to each other between a collapsed position, where said elongated pieces of said corresponding collapsible bracing unit are stacked on each other, and an extended position, where said elongated pieces of said corresponding collapsible bracing unit are in line with each other, said third connected ends of each of said collapsible bracing units being configured to be detachably and respectively connected to said first inner surfaces of said first elongated plates of a respective one of said front and rear sub-assemblies so as to strengthen said respective one of said front and rear sub-assemblies.

6. The modular bed assembly as claimed in claim 5, wherein said first inner surface has a concave region which is disposed between said first grooved region and said first connected end, and which is configured to permit a respective one of said third connected ends of said elongated pieces of said collapsible bracing units to be pressed fit thereinto.

7. The modular bed assembly as claimed in claim 1, wherein said second connected ends of said front sub-assembly are configured to mate with each other to permit said second elongated plates of said front sub-assembly to be brought into detachably interference engagement with each other, said second connected ends of said rear sub-assembly are configured to mate with each other to permit said second elongated plates of said rear sub-assembly to be brought into detachably interference engagement with each other, and said first connected ends of said front sub-assembly are configured to respectively mate with said first connected ends of said rear sub-assembly so as to permit said first elongated plates of said front sub-assembly to be brought into detachably interference engagement with said first elongated plates of said rear sub-assembly, respectively.

8. The modular bed assembly according to claim 1, further comprising a leg unit which is configured to elevate and place said front and rear sub-assemblies in a stationary state, and which includes a plurality of legs.

9. The modular bed assembly according to claim 1, further comprising a supporting web which is configured to be stretched between said front and rear sub-assemblies, and which includes a web body, a front lateral portion disposed at a front side of said web body, and configured to be secured to said second elongated plates of said front sub-assembly, a rear lateral portion disposed at a rear side of said web body, and configured to be secured to said second elongated plates of said rear sub-assembly, a left lateral portion disposed at a left side of said web body, and configured to be secured to two left ones of said first elongated pieces of said front and rear sub-assemblies, and a right lateral portion disposed at a right side of said web body, and configured to be secured to two right ones of said first elongated pieces of said front and rear sub-assemblies.

10. The modular bed assembly according to claim 9, wherein each of said front, rear, left, right lateral portions is enlarged compared to said web body, and is in a form of a tubular sleeve, said modular bed assembly further includes four reinforcing pieces each of which is configured to be inserted in said tubular sleeve of a respective one of said front, rear, left, right lateral portions so as to facilitate each of said front, rear, left, right lateral portions to be secured to two corresponding ones of said first and second elongated pieces of said front and rear sub-assemblies.

* * * * *